R. M. LOVEJOY.
ELEVATING HAND TRUCK.
APPLICATION FILED MAR. 1, 1916.
1,378,250. Patented May 17, 1921.
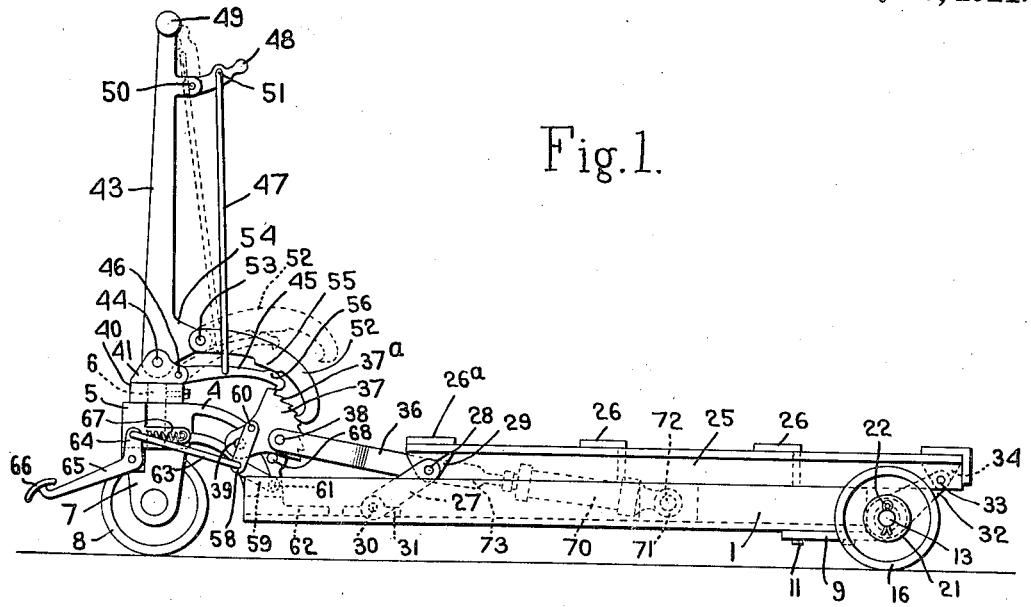
Fig. 1.
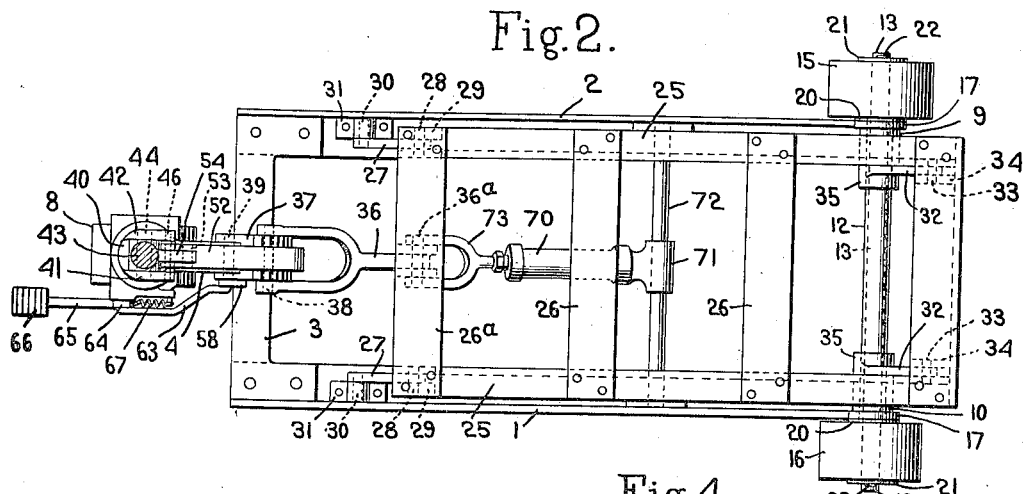
Fig. 2.
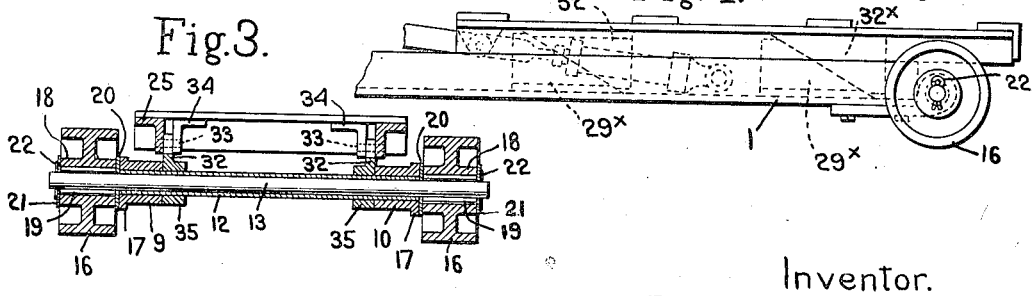
Fig. 3.
Fig. 4.
Inventor.
Ralph M. Lovejoy,
by Heard Smith & Tennant,
Attys.

UNITED STATES PATENT OFFICE.

RALPH M. LOVEJOY, OF MEREDITH, NEW HAMPSHIRE.

ELEVATING HAND-TRUCK.

1,378,250. Specification of Letters Patent. Patented May 17, 1921.

Application filed March 1, 1916. Serial No. 81,521.

*To all whom it may concern:*

Be it known that I, RALPH M. LOVEJOY, a citizen of the United States, and resident of Meredith, county of Belknap, State of New Hampshire, have invented an Improvement in Elevating Hand-Trucks, of which the following description, in connection with the accompanying drawing, is a specification, like characters on the drawing representing like parts.

This invention relates to improvements in hand trucks and particularly to the class of elevating hand trucks in which means are provided for raising the platform relatively to the main frame whereby the truck may be thrust beneath a load supported upon skids or other devices at a proper distance from the floor and the platform raised by suitable means to remove the load from its support so that it may be transported by the truck and again deposited by lowering the platform, and the construction disclosed herein comprises certain improvements in and modifications of the structure disclosed in my Patent No. 1,307,687, granted June 24, 1919.

One of the objects of the present invention is to provide an elevating hand truck of simplified construction in which the load supporting means or platform may be elevated step by step through mechanism including a power multiplying lever fulcrumed upon the frame having releasable interengaging means connecting the same to said tongue and operable by the raising and lowering of the tongue and in which independent means are provided for locking the elevating mechanism when the platform is at a predetermined elevation whereby the tongue may be disengaged from the elevating mechanism and thereafter turned freely to steer the truck.

Another object of the invention is to provide a novel locking means in the form of a toggle, operable independently of the tongue which may be broken easily by the operator when the loaded platform is in elevated position.

Another important feature of the invention resides in providing means for so journaling the wheels of the truck as to simplify and facilitate the construction of the truck and also to minimize undesirable wear upon the axle of the truck. This is accomplished in the preferred form of the invention disclosed herein by providing the frame with suitable journals in which a rotatable axle is inserted, the wheel or wheels being revolubly mounted upon said axle.

Other features of the invention will more fully appear from the following description and the accompanying drawings and will be pointed out in the annexed claims.

In the drawings:

Figure 1 is a side elevation of an elevating truck embodying the preferred form of my invention, Fig. 2 is a plan view of the same, the tongue being shown in section, Fig. 3 is a vertical sectional view through the axis of the rear wheels of the truck looking toward the rear, and Fig. 4 is a detail view of a similar truck showing a different means for raising the platform relatively to the frame.

The invention is disclosed herein as applied to an elevating truck in which the load supporting means or platform is moved longitudinally relatively to the frame of the truck, means such as parallel links connecting the frame and load supporting means, or coöperating inclined planes upon said frame and load supporting means, acting to raise the load supporting means during the relative longitudinal movement. In elevating trucks of this character heretofore constructed the longitudinal movement has been imparted to the frame by direct connection between the tongue and the platform, the leverage applied by the tongue in such instances being such that a single full sweep of the tongue serves to move the platform the required distance longitudinally of the frame to raise the platform to its full height. The present invention contemplates the interposition between the tongue and the load supporting means of a multiplying lever connected to the tongue by the interengaging members adapted to operate said multiplying lever step by step so that the platform may be raised by a plurality of swinging movements of the tongue. By reason of this construction trucks may be made which will be capable of lifting heavier loads than those which are operated by a single swinging movement of the tongue. The elevating mechanism of such trucks can be operated more easily as the operator in enabled to brace his foot against the front end of the truck and make successive short pulling movements upon the tongue without the necessity of changing his position as is required when a full sweep of the tongue is made.

The truck may comprise a frame of any desired form having suitable steering mechanism which includes a tongue mounted for vertical swinging movement and in which the power multiplying lever is mounted upon the frame and adapted to cause a longitudinal movement of the load supporting means relative to said frame.

The truck as illustrated herein comprises a main frame having longitudinally extending side members 1, 2, preferably made of rolled steel angle iron, connected at their front ends by a cross piece 3 having a centrally disposed upwardly arched member 4 provided at its forward end with a journal 5 for the stem 6 of the yoke 7 of a steering wheel 8. The longitudinal members 1, 2 of the frame may be connected at the rear end in any suitable manner by cross pieces and supported upon wheels journaled on rigid axles in the usual manner. However, it is found in practice that when the truck is thus constructed the under sides of the axles rapidly wear, for in the use of elevating trucks little attention is paid to lubrication and the trucks are employed in places where the dust and dirt rapidly accumulate in the bearings.

In order to avoid this objection I have devised a novel form of support for the rear end of the trucks which has the double function of uniting the longitudinally extending side members and also of providing an axle in which the wearing surfaces engaged by the hubs of the wheels are frequently shifted.

In the preferred embodiment of the invention disclosed herein this is accomplished by providing journal brackets 9, 10 which are suitably secured to the ends of the longitudinal members 1, 2 by bolts 11 or other suitable fastenings, said journal brackets being connected by a sleeve 12 preferably of steel tubing passing through central apertures in said brackets.

The axle 13 for the rear wheels preferably is in the form of a steel rod rotatably journaled in the sleeve 12, as a matter of fact the axle 13 may be slightly smaller in diameter than the interior diameter of the sleeve and merely inserted therein and the wheels 15, 16 rotatably secured upon the ends of said axle. It will thus be seen that the sleeve 12 and the journal brackets 9, 10 perform the double function of uniting the rear ends of the longitudinally extending members 1, 2 of the frame and also providing a journal for a rotatable rear axle. In the practical construction of the device the journal brackets 9, 10 preferably are cast upon the ends of the tubular steel sleeve 12 so that these parts are in effect an integral structure.

The outer ends of the bosses which form journals may be provided with annular flanges 17 preferably of a diameter equal to the external diameter of the hubs 18 of the wheels and the hubs of the wheels desirably may be provided with central apertures of a sufficient size to receive a series of anti-friction rollers 19. Disks 20 desirably are interposed between the inner faces of the hubs and the annular flanges 17 of the bosses of the journal brackets to prevent the admission of dust into the journal brackets. Disks 21, as large in diameter as the hub are secured upon the axle 13 by cotter pins 22 or other suitable means in such a manner as to prevent the admission of dust to the roller bearings through the outer end of the hubs.

By reason of this construction it is found that in use the axle 13 will be frequently if not constantly rotated so that there will be presented continuously a new bearing surface between the axle and the weight supporting portions of the hubs of the wheels so that the axle will wear uniformly instead of wearing entirely on its under surface as is usual in trucks of this character. This construction therefore, obviously will increase the life of the truck, for where trucks of this character are used with very heavy loads the wearing of the axle soon weakens the same sufficiently to result in breakage.

The present construction has a still further advantage in that if the axle becomes broken for any reason it can be almost instantly replaced by merely removing the wheels, withdrawing the rod forming the axle from the truck and inserting a new axle. This is very simple, since the axles desirably are made of standard size steel rods and all it is necessary to do to provide a new axle is to cut a rod to the right length and drill apertures for the cotter pins 22.

Any suitable mechanism may be utilized for supporting the platform to permit its elevation when loaded, such as the parallel links pivotally attached at their ends respectively to the main frame and the platform or by members secured to the frame and platform respectively, having oppositely disposed coöperating inclined surfaces as shown in Fig. 4 or by a system of platform supporting levers such as are illustrated in my patent referred to above or by suitable cams or other devices.

It is however, desirable that means be provided whereby the platform may be elevated step by step by the up and down movement of the tongue or some other lever and that means independent of the actuating mechanism be provided for locking the elevating mechanism when the platform is in a predetermined elevated position so that the actuating mechanism may be released. This is particularly important where, as is usual, the tongue is utilized as a lever to operate the platform elevating mechanism.

A convenient construction of this character is illustrated herein which is adapted to draw the platform forward relatively to the main frame and thereby cause its elevation by the parallel links shown in Fig. 1 or the coöperating inclined surfaces shown in Fig. 4.

In the truck construction shown in Figs. 1, 2, and 3 the platform is constructed of longitudinal members 25 preferably formed of angle iron and cross members 26, and is supported upon pairs of parallel links, the forward links 27 being pivotally connected at their upper ends to studs 28 carried by the depending flanges of the angle irons 25 and bosses 29, the lower ends of said links having lateral extensions 30 journaled in brackets or keepers 31 carried by the horizontal flanges of the longitudinally extending members of the main frame.

The rearward pair of links 32 may conveniently be pivotally mounted at their upper ends upon studs 33 carried by the vertical web of the longitudinal members 25 and suitable brackets 34, and at their lower ends provided with journals or yokes 35 adapted pivotally to engage the sleeve 12 which connects the sides of the main frame and which also contains the floating axle 13. By this construction a large portion of the weight of the load will be carried directly by the rear axle and the main frame relieved of a great deal of the strain which would be imposed upon it if the rearward links were connected to it in the same manner as the forward links.

In Fig. 4 a different form of elevating mechanism is disclosed which comprises a pair of wedge shaped members 29$^x$, secured upon the horizontal webs of the longitudinally extending side members 1 and 2 and coöperating oppositely disposed wedge shaped members 32$^x$ secured to the under side of the platform, the inclined faces of the members 32$^x$ resting upon the inclined faces of the members 29$^x$ so that when the platform is drawn forward it will simultaneously be raised relatively to the main frame.

The novel form of mechanism illustrated herein for drawing the platform forward to elevate it through the medium of the parallel links 27, 32 comprises a link 36 pivotally connected at its rear end to a stud or bolt 36$^a$ carried by brackets depending from the foremost cross piece 26$^a$ preferably midway of its length; said link 36 being forked at its opposite end to embrace a power multiplying lever in the form of a ratchet 37 and to which it is connected by a pin or bolt 38.

The ratchet 37 preferably is in the form of a sector axially pivoted upon a stud or bolt 39 anchored in the arched forward extension 4 of the main frame and having a series of teeth 37$^a$ on its arcuate end.

The ratchet may be actuated and controlled by any suitable lever mechanism and retaining means but preferably is actuated by a pawl connected with the tongue of the truck.

In the present illustrative embodiment of my invention a collar or head 40 is rigidly secured to the upper end of the pivotal stem 6 of the front steering wheel, said head being provided with parallel upwardly extending lugs 41, 42 between which the lower end of the tongue 43 is pivotally mounted upon a bolt 44 passing through said lugs and tongue.

A locking pawl 45 having a hooked end adapted to engage the teeth 37$^a$ of the sector shaped ratchet may also be conveniently pivoted between the lugs 41, 42 on a pin or bolt 46 said pawl desirably being connected by a link 47 with a releasing lever 48 pivoted upon said tongue adjacent the cross bar 49 forming the handle to be grasped by the operator. The lever 48 preferably is pivoted upon a stud 50 carried by a lateral extension of said tongue or a bracket thereon, said stud being at a sufficient distance from said tongue to permit the link 47 to cross the axis of the stud as the pawl is raised to elevated position so that when fully raised the pawl will be maintained in the position indicated in dotted lines Fig. 1, by reason of the fact that the pivotal connection 51 of the link 47 to the lever 48 lies between the tongue and the fulcrum 50 of the lever.

Lifting power may conveniently be applied to the sector 37 by a curved pawl 52 pivotally mounted upon a stud or bolt 53 carried by the lever 43 or by a lateral extension 54 thereof. The pawl 52 preferably is mounted directly above the pawl 45 and is provided with a hooked end adapted to engage the teeth 37$^a$ of the sector 37.

The pawl 52 is preferably formed with a downward projection 55 having a curved face adapted to engage a complementary projection 56 upon the upper side of the pawl 45, said projections acting as cams to cause proper coöperation of the pawls 45 and 52 with the ratchet and also in the disengagement of the pawls from the ratchet teeth 37$^a$.

It will be obvious that by pulling the tongue downwardly from the position illustrated in Fig. 1 the ratchet may be rotated upwardly step by step about its pivot, thus, through the link 36, pulling the platform forward and causing the parallel links to raise it relatively to the main frame, the ratchet being locked at each step by the engagement of the pawl 45 with the teeth 37$^a$.

If however the pawl 45 constituted the only means for locking the elevating mechanism it would be difficult to release the same to permit the platform to descend.

I have, therefore, provided an independent auxiliary locking mechanism to retain the platform in a predetermined position of elevation, preferably at its highest elevation.

This auxiliary locking means preferably is in the form of a toggle adapted when straightened to prevent descent of the platform but which may easily be broken by suitable manually operable means to permit the descent of the platform. This toggle mechanism may be interposed at any desired point in the elevating mechanism or between the platform and main frame as will be understood. It preferably is applied as illustrated in Figs. 1 and 2, wherein it is shown as a pair of toggle links 58 and 59 pivoted respectively to a stud 60 on the ratchet sector 37 and to a stud 61 on a bracket 62 carried by the main frame. The toggle links 58, 59 are pivotally connected together by the offset end of a link 63 which is connected at its opposite end to the arm 64 of a bell crank lever 65 pivoted upon the frame extension 4, said bell crank lever being provided with a pedal 66 adapted to be depressed by the operator. A spring 67 serves normally to counterbalance the weight of the lever 65 and tends normally to straighten the toggle. In order to hold the toggle in practically straight locking position the frame extension 4 is provided with a stud 68 lying in the path of the toggle and adapted to arrest the same as soon as it has passed dead center.

It will be apparent that in loading, as soon as the platform is raised to its highest position or such other position as may be provided for by toggle links of suitable length, the toggle links will be straightened and pass dead center so as to rest against the stud 68. Thereupon the pawl 52 and dog 45 may be easily released from engagement with the teeth 37ª of the ratchet and the tongue thus freed may be used to haul the loaded truck.

When the load is to be deposited a slight pressure of the foot of the operator upon the pedal 66 will rock the bell crank lever 65 causing the retraction of the link 63 and breaking the toggle so that the platform will descend.

Any suitable mechanism may be provided to cushion the descent of the platform. I have however shown herein a convenient cushioning means as consisting of a dash pot 70 of the usual character comprising a piston reciprocable in an oil containing cylinder and having suitable ports, the cylinder of said dash pot being provided with an extension 71 pivotally connected to a cross rod 72 carried by the side bars 1, 2 of the main frame. The piston of the dash pot is provided with a forked extension 73 pivotally connected to the pin or bolt 36ª which is carried by the lugs depending from the cross piece 26ª. By this construction the dash pot is conveniently located beneath the platform in an otherwise unoccupied space and is protected from harm.

While I have described a selected embodiment of my invention, it will readily be understood that it may be constructed in other forms within the spirit and scope of the following claims and particularly that the means for actuating the elevating mechanism step by step may be otherwise located as for example partially or wholly beneath the platform. It will also be understood that the elevating mechanism may be constructed to raise the platform vertically as disclosed in my prior application; by pulling it forward as illustrated herein or by thrusting it rearwardly as is common in elevating trucks of this character.

Having thus described my invention what I claim as new and desire to secure by Letters Patent is:

1. An elevating truck comprising a load supporting means, a steering mechanism including a tongue having an unlimited range of steering movement and pivotally mounted to swing vertically, interengaging means for elevating said load supporting means including a power multiplying lever fulcrumed upon a stationary pivotal support on said truck and connected to said load supporting means and located in a position in which it will not interfere with the free steering movement of said tongue and a coöperating member operable by the vertical swinging movement of the tongue to engage said power multiplying lever at different points whereby said load supporting means may be elevated step by step and means for locking said load supporting means at each step of elevation.

2. An elevating truck comprising a load supporting means, a steering mechanism including a tongue having an unlimited range of steering movement and pivotally mounted to swing vertically, interengaging means for elevating said load supporting means including a power multiplying lever fulcrumed upon a stationary pivotal support on said truck and connected to said load supporting means and located in a position in which it will not interfere with the free steering movement of said tongue and a coöperating member operable by the vertical swinging movement of the tongue to engage said power multiplying lever at different points whereby said load supporting means may be elevated step by step and means carried by said steering mechanism for locking said load supporting means at each step of elevation.

3. An elevating truck comprising a frame, load supporting means and steering mechanism including a tongue having an unlimited range of steering movement and pivotally mounted to swing vertically, interengaging means for elevating said load supporting means including a power multiplying lever pivoted at one end on said frame and having a ratchet at its opposite end, means connecting said power multiplying lever to said load supporting means located in a position in which it will not interfere with the free steering movement of said tongue and a coöperating pawl pivotally mounted upon said tongue adapted to engage the ratchet of said power multiplying means and means for locking said load supporting means at each step of elevation.

4. An elevating truck comprising a frame, load supporting means and steering mechanism including a tongue having an unlimited range of steering movement and pivotally mounted to swing vertically, interengaging means for elevating said load supporting means including a power multiplying lever pivoted at one end on said frame and having a ratchet at its opposite end, means connecting said power multiplying lever to said load supporting means located in a position in which it will not interfere with the free steering movement of said tongue, a coöperating pawl pivotally mounted upon said tongue adapted to engage the ratchet of said power multiplying means, means carried by said steering mechanism adapted to engage and lock said ratchet at each step of elevation.

5. An elevating truck comprising a frame, load supporting means and steering mechanism including a tongue having an unlimited range of steering movement and pivotally mounted to swing vertically, interengaging means for elevating said load supporting means including a power multiplying lever pivoted at one end on said frame and having a ratchet at its opposite end, means connecting said power multiplying lever to said load supporting means located in a position in which it will not interfere with the free steering movement of said tongue, a coöperating pawl pivotally mounted upon said tongue adapted to engage the ratchet of said power multiplying means, means carried by said steering mechanism adapted to engage and lock said ratchet at each step of elevation, and supplemental means for locking said power multiplying lever in a predetermined elevated position whereby said ratchet engaging means may be disengaged to permit free steering of the truck.

6. In an elevating truck comprising a main frame, steering mechanism including a steering head rotatably mounted therein, a tongue mounted upon said steering head to swing vertically, a platform and means for elevating said platform vertically upon relative longitudinal movement between said platform and said frame, a ratchet pivotally mounted upon said main frame and connected to said platform, a pawl connected to said tongue operable by vertical swinging movements of said tongue to actuate said ratchet and means for locking said platform at each step of elevation.

7. In an elevating truck comprising a main frame, steering mechanism including a steering head rotatably mounted therein, a tongue mounted upon said steering head to swing vertically, a platform and means for elevating said platform vertically upon relative longitudinal movement between said platform and said frame, a sector-shaped ratchet pivotally mounted upon said main frame and connected to said platform, a pawl pivotally mounted upon said tongue capable of engaging successive teeth upon said ratchet upon repeated vertical swinging movement of said tongue, and a dog pivotally mounted upon said steering head beneath said pawl adapted to engage successive teeth upon said ratchet as the same is actuated by the vertical swinging movement of said tongue.

8. In an elevating truck comprising a main frame, steering mechanism including a steering head rotatably mounted therein, a tongue mounted upon said steering head to swing vertically, a platform and means for elevating said platform vertically upon relative longitudinal movement between said platform and said frame, a sector-shaped ratchet pivotally mounted upon said main frame and connected to said platform, a pawl connected to said tongue capable of engaging successive teeth upon said ratchet upon repeated vertical swinging movement of said tongue, a dog pivotally mounted upon said steering head beneath said pawl adapted to engage successive teeth upon said ratchet as the same is actuated by the vertical swinging movement of said tongue, supplemental means for locking said ratchet in a predetermined position whereby said pawl and dog may be released to free the steering mechanism.

9. An elevating truck having a frame supported at its rear end upon a plurality of wheels and provided at its front end with a centrally disposed extension, steering mechanism including a post pivotally mounted in said extension, a tongue pivotally connected to said post, a platform, elevating devices intermediate of said frame and said platform adapted upon forward movement of the platform to elevate the same, means for moving the platform forward including a sector shaped ratchet pivotally mounted upon said extension, an actuating pawl connected to said tongue adapted to engage said ratchet and a ratchet retaining pawl cooperating therewith whereby an up and down movement of the tongue will actuate said ratchet.

10. In an elevating truck comprising a frame supported at its rear end by a pair of wheels and at its front end by pivotally mounted steering wheel mechanism including a tongue, a platform, elevating instrumentalities intermediate of said platform and frame, pawl and ratchet mechanism operable by said tongue to actuate said elevating means to raise the platform, toggle mechanism connecting said ratchet mechanism and said frame adapted to lock said platform in predetermined position and means for breaking said toggle.

11. In an elevating truck having a frame supported at its rear end upon a pair of wheels and provided at its front end with a centrally disposed extension providing a bearing for the post, a steering wheel having a vertical post journaled in said extension, a tongue pivotally mounted upon said post, a platform, elevating devices intermediate of said frame and said platform including a ratchet pivotally mounted upon said extension and connected to said platform, a ratchet retaining pawl, an actuating pawl carried by said tongue adapted to engage said ratchet and thereby to elevate the platform step by step, toggle mechanism for locking the ratchet when the platform is in elevating position and means for breaking said toggle to permit the platform to descend.

12. An elevating truck having a frame supported at its rear end upon a pair of wheels and provided at its front end with a centrally disposed extension, a steering wheel having a post mounted in said extension, a head on said post, a tongue pivotally mounted upon said head, a platform, elevating devices intermediate of said frame and said platform, means for actuating said elevating devices including a ratchet pivotally mounted upon said extension, a ratchet retaining pawl pivotally mounted upon said head, an actuating pawl connected to said tongue adapted to engage said ratchet and upon up and down movement of the tongue to actuate said ratchet, independent means for locking said ratchet when the platform is in elevated position and means operable simultaneously to release said retaining and actuating pawls.

13. An elevating truck having a frame supported at its rear end upon a pair of wheels and provided at its front end with a centrally disposed extension, a supporting wheel having a post mounted in said extension, a head on said post, a tongue pivotally mounted upon said head, a platform, elevating devices intermediate of said frame and said platform, means for actuating said elevating devices including a ratchet pivotally mounted upon said extension, a ratchet retaining pawl pivotally mounted upon said head, a ratchet actuating pawl pivotally mounted upon said tongue and overlying said retaining pawl, means independent of said pawls for locking said ratchet when the platform is in elevated position and means for raising said retaining pawl whereby the latter will disengage and raise the ratchet actuating pawl also to inoperative position.

14. An elevating truck having a frame supported at its rear end upon a pair of wheels and provided at its front end with a centrally disposed extension, a supporting wheel having a post mounted in said extension, a head on said post, a tongue pivotally mounted upon said head, a platform, elevating devices intermediate of said frame and said platform, means for actuating said elevating devices including a ratchet pivotally mounted upon said extension, a ratchet retaining pawl pivotally mounted upon said head, a ratchet actuating pawl pivoted upon said tongue and overlying said retaining pawl, toggle mechanism for locking said ratchet when the platform is in elevated position, a link connected to said retaining pawl, a lever carried by the tongue adjacent the handle thereof and means connecting said lever to said pawl whereby upon the actuation of said lever the retaining pawl will be disengaged from the ratchet and the actuating pawl also disengaged and removed to inoperative position.

15. In an elevating truck comprising load supporting means and elevating means for raising said load supporting means, a ratchet member connected to said load supporting means, coöperating locking means engaging said ratchet including a toggle adapted when straightened to lock the ratchet against descent and means for breaking said toggle to permit the release of said ratchet.

In testimony whereof, I have signed my name to this specification.

RALPH M. LOVEJOY.